(12) United States Patent
Mizutaki et al.

(10) Patent No.: US 9,469,771 B2
(45) Date of Patent: *Oct. 18, 2016

(54) ULTRAVIOLET RAY-CURABLE CLEAR INK COMPOSITION AND RECORDING METHOD

(71) Applicant: Seiko Epson Corporation, Tokyo (JP)

(72) Inventors: Yusuke Mizutaki, Shiojiri (JP); Hiroki Nakane, Matsumoto (JP); Eiji Okamoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/850,749

(22) Filed: Mar. 26, 2013

(65) Prior Publication Data

US 2013/0258015 A1    Oct. 3, 2013

(30) Foreign Application Priority Data

Mar. 28, 2012 (JP) ................. 2012-074083

(51) Int. Cl.
*B41J 2/01* (2006.01)
*C09D 11/30* (2014.01)
(Continued)

(52) U.S. Cl.
CPC ............. *C09D 11/30* (2013.01); *B41J 2/2107* (2013.01); *B41J 11/002* (2013.01); *C09D 11/101* (2013.01)

(58) Field of Classification Search
CPC .......... B41J 2/01; B41J 2/211; B41J 2/1433; B41J 2/17; B41J 2/17593; B41J 2/2107; B41J 2/1755; B41J 2/2114; B41J 11/0015; B41J 2/2056; B41J 2/21; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00
USPC ....... 347/100, 95, 96, 88, 99, 102, 101, 105; 106/31.6, 31.27, 31.13; 523/160, 161
See application file for complete search history.

(56) References Cited

U.S. PATENT DOCUMENTS

| 4,507,466 A | 3/1985 | Tomalia et al. |
| 4,558,120 A | 12/1985 | Tomalia et al. |

(Continued)

FOREIGN PATENT DOCUMENTS

| CN | 101163758 A | 4/2008 |
| CN | 101573387 A | 11/2009 |

(Continued)

OTHER PUBLICATIONS

[No Author Listed] High lights! Radiation curing with resins and photoinitiators for industrial coatings and graphic arts: Laromer, Irgacure, Lucirin, Darocur. BASF SE. No publishing date available. 44 pages.

*Primary Examiner* — Manish S Shah
(74) *Attorney, Agent, or Firm* — Nutter McClennen & Fish LLP; John J. Penny, Jr.; Alex Nagorniy

(57) ABSTRACT

An ultraviolet ray-curable clear ink composition includes a polymerizable compound; and a photopolymerization initiator, in which the polymerizable compound contains a vinyl ether group-containing (meth)acrylic acid ester represented by the following formula (I) and 5% by mass to 25% by mass of urethane oligomer with respect to the total mass of the ink composition.

$$CH_2=CR^1-COOR^2-O-CH=CH-R^3 \quad (I)$$

(in the formula (I), $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms).

20 Claims, 1 Drawing Sheet

(51) Int. Cl.
  *B41J 2/21* (2006.01)
  *C09D 11/101* (2014.01)
  *B41J 11/00* (2006.01)

(56) References Cited

U.S. PATENT DOCUMENTS

| | | |
|---|---|---|
| 4,568,737 A | 2/1986 | Tomalia et al. |
| 4,587,329 A | 5/1986 | Tomalia et al. |
| 4,631,337 A | 12/1986 | Tomalia et al. |
| 4,694,064 A | 9/1987 | Tomalia et al. |
| 5,041,516 A | 8/1991 | Frechet et al. |
| 6,023,547 A | 2/2000 | Tortorello |
| 6,310,115 B1 | 10/2001 | Vanmaele et al. |
| 6,767,980 B2 | 7/2004 | Yurugi et al. |
| 6,913,352 B2 | 7/2005 | Yoshihiro et al. |
| 6,966,643 B2 | 11/2005 | Hale et al. |
| 7,396,861 B2 | 7/2008 | Loccufier et al. |
| 7,507,773 B2 | 3/2009 | Loccufier et al. |
| 7,507,785 B2 | 3/2009 | Vanmaele et al. |
| 7,538,144 B2 | 5/2009 | Vanmaele et al. |
| 7,795,324 B2 | 9/2010 | Loccufier et al. |
| 7,803,851 B2 | 9/2010 | Ishibashi et al. |
| 7,875,698 B2 | 1/2011 | Vanmaele et al. |
| 7,931,827 B2 | 4/2011 | Schneider et al. |
| 8,158,214 B2 | 4/2012 | Fukumoto et al. |
| 8,192,804 B2 | 6/2012 | Fukumoto et al. |
| 8,470,904 B2 | 6/2013 | Sato et al. |
| 9,090,787 B2 | 7/2015 | Yoda et al. |
| 9,109,125 B2 | 8/2015 | Miura et al. |
| 9,115,290 B2 | 8/2015 | Kida et al. |
| 2002/0065335 A1 | 5/2002 | Noguchi et al. |
| 2002/0149659 A1 | 10/2002 | Wu et al. |
| 2003/0199655 A1 | 10/2003 | Yurugi et al. |
| 2004/0141040 A1* | 7/2004 | Nakajima ............ 347/102 |
| 2004/0145639 A1 | 7/2004 | Noutary |
| 2004/0166249 A1 | 8/2004 | Siegel |
| 2006/0158493 A1 | 7/2006 | Nakano et al. |
| 2006/0160917 A1 | 7/2006 | Oyanagi et al. |
| 2007/0129457 A1 | 6/2007 | Nakano et al. |
| 2007/0211111 A1 | 9/2007 | Hayata |
| 2007/0249750 A1 | 10/2007 | Oyanagi et al. |
| 2008/0081119 A1 | 4/2008 | Oyanagi et al. |
| 2008/0090930 A1 | 4/2008 | Madhusoodhanan et al. |
| 2008/0108747 A1* | 5/2008 | Nakamura et al. ........... 524/606 |
| 2008/0166495 A1 | 7/2008 | Maeno et al. |
| 2008/0180503 A1 | 7/2008 | Umebayashi |
| 2008/0200578 A1 | 8/2008 | Noutary |
| 2008/0226834 A1* | 9/2008 | Krohn ............ 427/514 |
| 2009/0000508 A1* | 1/2009 | Edison et al. ............ 106/31.6 |
| 2009/0041946 A1 | 2/2009 | Fukumoto et al. |
| 2009/0099277 A1* | 4/2009 | Nagvekar et al. ............ 522/153 |
| 2009/0118388 A1* | 5/2009 | Naruse et al. ............ 347/102 |
| 2009/0197988 A1* | 8/2009 | Kito et al. ............ 522/26 |
| 2009/0280302 A1* | 11/2009 | Fukumoto et al. ......... 428/195.1 |
| 2010/0048756 A1 | 2/2010 | Loccufier et al. |
| 2010/0133728 A1 | 6/2010 | Yonezawa et al. |
| 2010/0313782 A1* | 12/2010 | Loccufier et al. ............ 101/483 |
| 2011/0234680 A1* | 9/2011 | Aoyama et al. ............ 347/20 |
| 2011/0251298 A1 | 10/2011 | Kagose et al. |
| 2012/0069108 A1 | 3/2012 | Oyanagi et al. |
| 2012/0147095 A1 | 6/2012 | Miura et al. |
| 2012/0229583 A1 | 9/2012 | Fukumoto et al. |
| 2012/0252919 A1 | 10/2012 | Suzuki et al. |
| 2012/0274717 A1 | 11/2012 | Nakano et al. |
| 2013/0010039 A1 | 1/2013 | Kida et al. |
| 2013/0063535 A1 | 3/2013 | Yoda et al. |
| 2014/0104356 A1 | 4/2014 | Kitade et al. |
| 2014/0160215 A1 | 6/2014 | Saito et al. |
| 2015/0275001 A1 | 10/2015 | Yoda et al. |
| 2015/0315394 A1 | 11/2015 | Miura et al. |
| 2015/0315396 A1 | 11/2015 | Kida et al. |

FOREIGN PATENT DOCUMENTS

| | | |
|---|---|---|
| EP | 2 017 311 A1 | 1/2009 |
| EP | 2 053 103 A1 | 4/2009 |
| EP | 2 399 966 A1 | 12/2011 |
| EP | 2399965 A1 | 12/2011 |
| EP | 2543707 A1 | 1/2013 |
| JP | 11-302562 A | 11/1999 |
| JP | 3461501 B1 | 10/2003 |
| JP | 2004-067991 A | 3/2004 |
| JP | 2004-099796 A | 4/2004 |
| JP | 3544658 B2 | 7/2004 |
| JP | 2004-224841 A | 8/2004 |
| JP | 2004-526820 A | 9/2004 |
| JP | 2006-028518 A | 2/2006 |
| JP | 2006-176734 A | 7/2006 |
| JP | 2006-181801 A | 7/2006 |
| JP | 2006-199924 A | 8/2006 |
| JP | 2006-206875 A | 8/2006 |
| JP | 2006-232989 A | 9/2006 |
| JP | 2007-045989 A | 2/2007 |
| JP | 2007-083509 A | 4/2007 |
| JP | 2007-100054 A | 4/2007 |
| JP | 2007-136988 A | 6/2007 |
| JP | 2007-182536 A | 7/2007 |
| JP | 2007-314744 A | 12/2007 |
| JP | 2007-314775 A | 12/2007 |
| JP | 2008-019292 A | 1/2008 |
| JP | 2008-507598 A | 3/2008 |
| JP | 2008-120991 A | 5/2008 |
| JP | 2008-179136 A | 8/2008 |
| JP | 2008-280383 A | 11/2008 |
| JP | 4204333 B2 | 1/2009 |
| JP | 2009-057548 A | 3/2009 |
| JP | 2009-062541 A | 3/2009 |
| JP | 2009-096910 A | 5/2009 |
| JP | 2009-226863 A | 10/2009 |
| JP | 2010-157706 A | 7/2010 |
| JP | 2010-179536 A | 8/2010 |
| JP | 2011-500932 A | 1/2011 |
| JP | 2011-502188 A | 1/2011 |
| JP | 2011-074134 | 4/2011 |
| JP | 2011-137069 A | 7/2011 |
| JP | 2011-194573 A | 10/2011 |
| JP | 2012-207084 A | 10/2012 |
| JP | 2013-053208 A | 3/2013 |
| WO | 03/089486 A1 | 10/2003 |
| WO | 2006/085992 A2 | 8/2006 |
| WO | 2009/053305 A1 | 4/2009 |
| WO | 2011/027162 A1 | 3/2011 |
| WO | 2011/076703 A1 | 6/2011 |
| WO | 2012/172973 A1 | 12/2012 |
| WO | 2012/172974 A1 | 12/2012 |

* cited by examiner

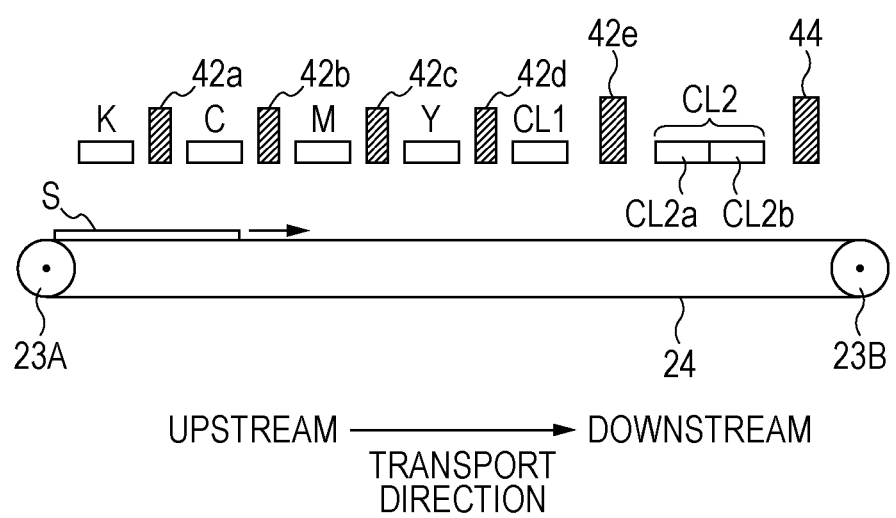

ULTRAVIOLET RAY-CURABLE CLEAR INK COMPOSITION AND RECORDING METHOD

BACKGROUND

1. Technical Field

The present invention relates to an ultraviolet ray-curable clear ink composition and a recording method.

2. Related Art

In the related art, various methods are used as a recording method of forming an image on a recording medium such as paper based on image data signals. Among these methods, when an ink jet method is used, ink can be discharged onto only a desired image portion of a recording medium with an inexpensive apparatus and an image is directly formed on the recording medium. Therefore, ink can be efficiently used and running cost is low. Furthermore, little noise is made in the ink jet method, which is superior as a recording method.

Recently, in order to form an image having superior water resistance, solvent resistance, and wear resistance on a surface of a recording medium, an ultraviolet ray-curable ink composition that is cured by irradiation of light (ultraviolet rays) has been used in the ink jet recording method.

For example, JP-A-2011-194573 discloses a clear ink composition that contains a phosphorus-based antioxidant to prevent yellowing.

In addition, JP-2006-181801 discloses a clear ink containing epoxy acrylate, ethylene oxide-added trimethylolpropane triacrylate, dipropylene glycol diacrylate, and isooctyl acrylate (Preparation Example 9 of JP-A-2006-181801).

However, the clear ink compositions disclosed in JP-A-2011-194573 and JP-A-2006-181801 have problems in that at least one of curability, weather resistance, and wear resistance deteriorates.

SUMMARY

An advantage of some aspects of the invention is to provide an ultraviolet ray-curable clear ink composition having superior curability, weather resistance, and wear resistance.

The present inventors have thoroughly studied and found that the above-described problems could be solved using an ultraviolet ray-curable clear ink composition including: a vinyl ether group-containing (meth)acrylic acid ester having a predetermined structure; a predetermined amount of urethane oligomer; and a photopolymerization initiator, thereby completing the invention.

That is, the invention adopts the following means.

[1] An ultraviolet ray-curable clear ink composition including: a polymerizable compound; and a photopolymerization initiator, wherein the polymerizable compound contains a vinyl ether group-containing (meth)acrylic acid ester represented by the following formula (I) and 5% by mass to 25% by mass of urethane oligomer with respect to the total mass of the ink composition.

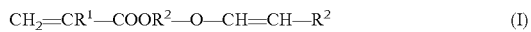

(in the formula (I), $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms)

[2] The ultraviolet ray-curable clear ink composition according to [1], wherein the urethane oligomer contains a bifunctional to tetrafunctional (meth)acryloyl group.

[3] The ultraviolet ray-curable clear ink composition according to [1] or [2], wherein the urethane oligomer is an aliphatic urethane oligomer.

[4] The ultraviolet ray-curable clear ink composition according to any one of [1] to [3], wherein the polymerization initiator contains 5% by mass to 13% by mass of acylphosphine oxide compound with respect to the total mass of the ink composition.

[5] The ultraviolet ray-curable clear ink composition according to according to any one of [1] to [4], wherein the polymerizable compound further contains at least one of a monofunctional (meth)acrylate having an aromatic ring structure and a monofunctional (meth)acrylate which has an aliphatic structure having a hydroxyl group.

[6] The ultraviolet ray-curable clear ink composition according to any one of [1] to [5], wherein a content of the vinyl ether group-containing (meth)acrylic acid ester represented by the formula (I) is 20% by mass to 70% by mass with respect to the total mass of the ink composition.

[7] A recording method including: discharging the ultraviolet ray-curable clear ink composition according to any one of [1] to [6] onto a recording medium to be attached thereonto; and curing the attached ultraviolet ray-curable clear ink composition, wherein the thickness of the cured ultraviolet ray-curable clear ink composition is 8 μm to 40 μm.

[8] A recording method including: discharging the ultraviolet ray-curable clear ink composition according to any one of [1] to [6] onto a recording medium to be attached thereonto; and curing the attached ultraviolet ray-curable clear ink composition, wherein the thickness of the cured ultraviolet ray-curable clear ink composition is 15 μm to 40 μm.

[9] The recording method according to [7] or [8], wherein in the curing, the ultraviolet ray-curable clear ink composition is irradiated with ultraviolet rays emitted from a light emitting diode having a peak wavelength of 360 nm to 420 nm to cure the ultraviolet ray-curable clear ink composition.

[10] The recording method according to [8], wherein the discharging and the irradiation of ultraviolet rays on the ultraviolet ray-curable clear ink composition, attached onto the recording medium in the discharging, are performed multiple times.

BRIEF DESCRIPTION OF THE DRAWING

The invention will be described with reference to the accompanying drawing, wherein like numbers reference like elements.

FIGURE is a diagram schematically illustrating an example of a configuration in the vicinity of a head of a recording apparatus which can be used in an embodiment of the invention.

DESCRIPTION OF EXEMPLARY EMBODIMENTS

Hereinafter, embodiments of the invention will be described. The invention is not limited to the following embodiments, and various modifications can be made within a range not departing from the concept of the invention.

In the specification, "recorded material" refers to a recording medium on which a cured material is formed using an ink. The cured material described in this specification refers to a cured material containing a cured film or a coating film.

In addition, in this specification, "curing" refers to irradiating an ink containing a polymerizable compound with ultraviolet rays to polymerize the polymerizable compound and to fix the ink composition. In this specification, "curability" refers to the property of being polymerized and cured by irradiation of ultraviolet rays in the presence of a photopolymerization initiator.

"Wear resistance" refers to the property of a cured material not easily being peeled off or worn off when being rubbed with unbleached muslin. "Transparency" refers to the property of a cured material, formed from a clear ink, being (substantially) transparent. "Weather resistance" refers to the property of a cured film, formed from a clear ink, not easily being turned yellow when being exposed to high-energy ultraviolet rays.

In this specification, "solubility" refers to the property of a powder component among materials, contained in an ink composition, being dissolved within 12 hours after mixing. "Storage stability" refers to the property of a viscosity of an ink not easily being changed before and after the ink is stored. "Discharge stability" refers to the property of continuously stably discharging droplets of an ink composition from nozzles without nozzle clogging.

In this specification, "(meth)acrylate" represents at least one of acrylate and corresponding methacrylate; "(meth)acryl" represents at least one of acryl and corresponding methacryl; and "(meth)acryloyl" represents at least one of acryloyl and corresponding methacryloyl.

Ultraviolet Ray-Curable Clear Ink Composition

An embodiment of the invention relates to an ultraviolet ray-curable clear ink composition. The ultraviolet ray-curable clear ink composition contains a polymerizable compound and a photopolymerization initiator. Furthermore, the polymerizable compound contains a vinyl ether group-containing (meth)acrylic acid ester represented by the following formula (I); and 5% by mass to 25% by mass of urethane oligomer with respect to the total mass (100% by mass) of the ink composition.

Hereinafter, additives (components), which are included in or may be included in the ultraviolet ray-curable clear ink composition (hereinafter, also referred to as "ink composition") according to the embodiment, will be described.

Polymerizable Compound

The polymerizable compound contained in the ink composition can be polymerized by the reaction of the photopolymerization initiator described below, and thus the printed ink can be cured.

Vinyl Ether Group-Containing (Meth)Acrylic Acid Esters

The vinyl ether group-containing (meth)acrylic acid ester, which is the essential polymerizable compound in the embodiment, is represented by the following formula (I).

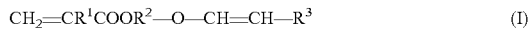

$$CH_2=CR^1COOR^2—O—CH=CH—R^3 \quad (I)$$

In the formula (I), $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms.

When the ink composition contains the vinyl ether group-containing (meth)acrylic acid ester, the viscosity of the ink can be reduced, the curability of the ink can be improved, and the viscosity of the ink can be reduced. Furthermore, a case of using a compound having both a vinyl ether group and a (meth)acrylic group in one molecule is more preferable to a case of separately using a compound having a vinyl ether group and a compound having a (meth)acrylic group, from the viewpoint of improving the curability of the ink.

In the formula (I), preferable examples of the divalent organic residue having 2 to 20 carbon atoms represented by $R^2$ include an linear, branched, or cyclic alkylene group having 2 to 20 carbon atoms which may be substituted; an alkylene group having 2 to 20 carbon atoms and having an oxygen atom of an ether bond or an ester bond in a structure thereof which may be substituted; and a divalent aromatic group having 6 to 11 carbon atoms which may be substituted. Among these, an alkylene group having 2 to 6 carbon atoms such as an ethylene group, an n-propylene group, an isopropylene group, or a butylene group; and an alkylene group having 2 to 9 carbon atoms and an oxygen atom of an ether bond in a structure thereof such as an oxyethylene group, an oxy-n-propylene group, an oxyisopropylene group, or an oxybutylene group are preferably used.

In the formula (I), preferable examples of the monovalent organic residue having 1 to 11 carbon atoms represented by $R^3$ include a linear, branched, or cyclic alkyl group having 1 to 10 carbon atoms which may be substituted; and an aromatic group having 6 to 11 carbon atoms which may be substituted. Among these, an alky group having 1 or 2 carbon atoms such as a methyl group or an ethyl group; and an aromatic group having 6 to 8 carbon atoms such as a phenyl group or a benzyl group are preferably used.

When each organic residue described above is a groups which may be substituted, examples of a substituent thereof are divided into a group having carbon atoms and a group not having carbon atoms. First, when the substituent is a group having carbon atoms, the number of the carbon atoms corresponds to the number of carbon atoms contained in the organic residue. Examples of the group having carbon atoms include a carboxylic group and an alkoxy group, but the group having carbon atoms is not limited thereto. Next, examples of the group not having carbon atoms include a hydroxyl group and a halo group, but the group not having carbon atoms is not limited thereto.

Examples of the vinyl ether group-containing (meth)acrylic acid ester include 2-vinyloxyethyl(meth)acrylate, 3-vinyloxypropyl(meth)acrylate, 1-methyl-2-vinyloxyethyl(meth)acrylate, 2-vinyloxypropyl(meth)acrylate, 4-vinyloxybutyl(meth)acrylate, 1-methyl-3-vinyloxypropyl(meth)acrylate, 1-vinyloxymethylpropyl(meth)acrylate, 2-methyl-3-vinyloxypropyl(meth)acrylate, 1,1-dimethyl-2-vinyloxyethyl(meth)acrylate, 3-vinyloxybutyl(meth)acrylate, 1-methyl-2-vinyloxypropyl(meth)acrylate, 2-vinyloxybutyl(meth)acrylate, 4-vinyloxycyclohexyl(meth)acrylate, 6-vinyloxyhexyl(meth)acrylate, 4-vinyloxymethylcyclohexylmethyl(meth)acrylate, 3-vinyloxymethylcyclohexylmethyl(meth)acrylate, 2-vinyloxymethylcyclohexylmethyl(meth)acrylate, p-vinyloxymethylphenylmethyl(meth)acrylate, m-vinyloxymethylphenylmethyl(meth)acrylate, o-vinyloxymethylphenylmethyl(meth)acrylate, 2-(vinyloxyethoxy)ethyl(meth)acrylate, 2-(vinyloxyisopropoxy)ethyl(meth)acrylate, 2-(vinyloxyethoxy)propyl(meth)acrylate, 2-(vinyloxyethoxy)isopropyl(meth)acrylate, 2-(vinyloxyisopropoxy)propyl(meth)acrylate, 2-(vinyloxyisopropoxy)isopropyl(meth)acrylate, 2-(vinyloxyethoxyethoxy)ethyl(meth)acrylate, 2-(vinyloxyethoxyisopropoxy)ethyl(meth)acrylate, 2-(vinyloxyisopropoxyethoxy)ethyl(meth)acrylate, 2-(vinyloxyisopropoxyisopropoxy)ethyl(meth)acrylate, 2-(vinyloxyethoxyethoxy)propyl(meth)acrylate, 2-(vinyloxyethoxyisopropoxy)propyl(meth)acrylate, 2-(vinyloxyisopropoxyethoxy)propyl(meth)acrylate, 2-(vinyloxyisopropoxyisopropoxy)propyl(meth)acrylate, 2-(vinyloxyethoxyethoxy)isopropyl(meth)acrylate, 2-(vinyloxyethoxyisopropoxy)isopropyl(meth)acrylate, 2-(vinyloxyisopropoxyethoxy)isopropyl(meth)acrylate, 2-(vinyloxyisopropoxyisopropoxy)isopropyl(meth)acrylate, 2-(vinyloxyethoxyethoxyethoxy)ethyl(meth)acrylate, 2-(vinyloxyethoxyethoxyethoxyethoxy)ethyl(meth)acrylate, 2-(isopropenoxyethoxy)ethyl(meth)acrylate, 2-(isopropenoxyethoxyethoxy)ethyl(meth)acrylate, 2-(isopropenoxyethoxyethoxyethoxy)ethyl(meth)acrylate, 2-(isopropenoxyethoxyethoxyethoxyethoxy)ethyl(meth)acrylate, polyethylene glycol monovinyl ether(meth)acrylate, and polypropylene glycol monovinyl ether(meth)acrylate. However, the vinyl ether group-containing (meth)acrylic acid ester is not limited thereto.

Among these, from the viewpoints of reducing the viscosity of the ink, increasing the flash point, and improving the curability of the ink, 2-(vinyloxyethoxy)ethyl(meth)acrylate, that is, at least one of 2-(vinyloxyethoxy)ethyl acrylate and 2-(vinyloxyethoxy)ethyl methacrylate is preferable; and 2-(vinyloxyethoxy)ethyl acrylate is more preferable. In particular, both 2-(vinyloxyethoxy)ethyl acrylate and 2-(vinyloxyethoxy)ethyl methacrylate have a simple structure and a low molecular weight, the viscosity of the ink can be significantly reduced. Examples of 2-(vinyloxyethoxy)ethyl(meth)acrylate include 2-(2-vinyloxyethoxy)ethyl(meth)acrylate and 2-(1-vinyloxyethoxy)(meth)acrylate. Examples of 2-(vinyloxyethoxy)ethyl acrylate include 2-(2-vinyloxyethoxy)ethyl acrylate and 2-(1-vinyloxyethoxy) acrylate. 2-(vinyloxyethoxy)ethyl acrylate is superior to 2-(vinyloxyethoxy)ethyl methacrylate from the viewpoints of curability.

As the vinyl ether group-containing (meth)acrylic acid ester, one kind may be used alone or two or more kinds may be used in combination.

The content of the vinyl ether group-containing (meth)acrylic acid ester is preferably 10% by mass to 70% by mass, more preferably 20% by mass to 70% by mass, still more preferably from 20% by mass to 60% by mass, and even still more preferably from 20% by mass to 45% by mass with respect to the total mass (100% by mass) of the ink. When the content is greater than or equal to 10% by mass, the viscosity of the ink can be reduced and the curability of the ink can be further improved. When the content is greater than or equal to 20% by mass, curability, weather resistance, transparency, and wear resistance can be further improved. Meanwhile, when the content is less than or equal to 70% by mass, the storage stability of the ink can be satisfactorily maintained.

Examples of a method of preparing the vinyl ether group-containing (meth)acrylic acid esters include a method (preparation method B) of esterifying (meth)acrylic acid with hydroxyl group-containing vinyl ether, a method (preparation method C) of esterifying (meth)acrylic acid halide with hydroxyl group-containing vinyl ether, a method (preparation method D) of esterifying (meth)acrylic anhydride with hydroxyl group-containing vinyl ether, a method (preparation method E) of ester-exchanging (meth)acrylate with hydroxyl group-containing vinyl ether, a method (preparation method F) of esterifying (meth)acrylic acid with halogen-containing vinyl ether, a method (preparation method G) of esterifying (meth)acrylic acid alkali (earth) metal salt with halogen-containing vinyl ether, a method (preparation method H) of vinyl-exchanging hydroxyl group-containing (meth)acrylate with vinyl carboxylate, and a method (preparation method I) of ether-exchanging hydroxyl group-containing (meth)acrylate with alkyl vinyl ether. However, the method of preparing vinyl ether group-containing (meth)acrylic acid esters is not limited thereto.

Among these methods, the preparation method E is preferable from the viewpoint of obtaining superior desired effects of the embodiment.

Urethane Oligomer

The urethane oligomer, which is the essential polymerizable compound in the embodiment, represents one having one or more urethane bonds and one or more polymerizable unsaturated double bonds. When the ink composition contains the urethane oligomer, curability and weather resistance are improved.

Examples of a synthesis method of the urethane oligomer include condensation reaction of an isocyanate group contained in polyisocyanate with a hydroxyl group contained in an hydroxyl-containing compound such as alcohols or polyols. However, the synthesis method is not limited thereto.

The urethane oligomer contains preferably a (meth)acryloyl group, more preferably a monofunctional to tetrafunctional (meth)acryloyl group, and still more preferably a bifunctional to tetrafunctional (meth)acryloyl group. When the urethane oligomer contains a (meth)acryloyl group having the above-described number of functional groups, weather resistance is further improved. Hereinafter, "the number of functional groups contained in a (meth)acryloyl group" will be simply referred to as "the number of functional groups".

In addition, examples of the preferable kind of the urethane oligomer will be described focusing on a synthesis method thereof. First, preferable examples of the urethane oligomer focusing on the polyisocyanate include an urethane oligomer obtained by reaction of a polyisocyanate having an aliphatic structure; and an urethane oligomer obtained by reaction of a polyisocyanate having an aromatic structure.

In addition, examples of the hydroxyl-containing compound include a hydroxyl-containing compound having an aliphatic structure; and a hydroxyl-containing compound having an aromatic structure. Preferable examples of the urethane oligomer focusing on the hydroxyl group-containing compound include an aliphatic urethane oligomer obtained by reaction of the hydroxyl-group containing having an aliphatic structure with a polyisocyanate having an aliphatic structure; and an aromatic urethane oligomer obtained by reaction of a polyisocyanate and a hydroxyl group-containing compound at least one of which has an aromatic ring structure.

Next, preferable examples of the urethane oligomer focusing on the hydroxyl group-containing compound include a polyether-based urethane oligomer having a urethane bond and an ether bond; a polyester-based urethane oligomer having a urethane bond and an ester bond; and a polycarbonate-based urethane oligomer having a urethane bond and a carbonate bond.

Examples of a synthesis method of the polyether-based urethane oligomer include reaction of a bifunctional polyether such as poly(oxypropylene)glycol or poly(oxytetramethylene)glycol with diisocyanate. However, the synthesis method is not limited thereto. Examples of a synthesis method of the polyester-based urethane oligomer include polyaddition reaction of adipate, obtained by polycondensation of adipic acid and polyol, with diisocyanate. However, the synthesis method is not limited thereto. Examples of a synthesis method of the polycarbonate-based urethane oligomer include urethanization reaction of polycarbonate diol, obtained by transesterification of a carbonate compound and a diol compound in the presence of a transesterification catalyst, with diisocyanate. However, the synthesis method is not limited thereto.

When the kind of the urethane oligomer is selected from the above-described preferable examples, wear resistance is further improved. In addition, among these, the aliphatic urethane oligomer is more preferable from the viewpoint of further improving weather resistance.

The above-described preferable examples of the urethane oligomer focusing on the synthesis method may contain a (meth)acryloyl group having the above-described number of functional groups.

Examples of commercially available products of the aliphatic urethane acrylate oligomer include CN 929 (polyester-based aliphatic urethane acrylate, number of functional groups: 3), CN 962 (polyester-based aliphatic urethane acrylate, number of functional groups: 2), CN 963 (polyester-based aliphatic urethane acrylate, number of functional groups: 2), CN 964 (polyester-based aliphatic urethane acrylate, number of functional groups: 2), CN 965 (polyester-based aliphatic urethane acrylate, number of functional groups: 2), CN 968 (polyester-based aliphatic urethane acrylate, number of functional groups: 6), CN 980 (polyester-based aliphatic urethane acrylate, number of functional groups: 2), CN 981 (polyester-based aliphatic urethane acrylate, number of functional groups: 2), CN 982 (polyester-based aliphatic urethane acrylate, number of functional groups: 2), CN 983 (polyester-based aliphatic urethane acrylate, number of functional groups: 2), CN 996 (polyether-based aliphatic urethane acrylate, number of functional groups: 2), CN 9001 (polyester-based aliphatic urethane acrylate, number of functional groups: 2), CN 9002 (polyester-based aliphatic urethane acrylate, number of functional groups: 2), CN 9788 (polyester-based aliphatic urethane acrylate, number of functional groups: 2), and CN 9893 (polyether-based aliphatic urethane acrylate, number of functional groups: 2) (trade names, all of which are manufactured by Sartomer company); and EBECRYL 230 (number of functional groups: 2), 270 (number of functional groups: 2), 5129 (number of functional groups: 6), 8210 (number of functional groups: 4), 8301 (number of functional groups: 6), 8311 (number of functional groups: 3), 8402 (number of functional groups: 2), 8405 (number of functional groups: 4), 8701 (number of functional groups: 3), 8804 (number of functional groups: 2), 8807 (number of functional groups: 2), 9260 (number of functional groups: 3), and 9270 (number of functional groups: 2) and KRM 8200 (number of functional groups: 6), 8296 (number of functional groups: 3), and 8452 (number of functional groups: 10) (trade names, all of which are manufactured by DAICEL-CYTEC Co., Ltd.). Examples of commercially available products of the aromatic urethane acrylate oligomer include CN 971 (polyester-based aromatic urethane acrylate, number of functional groups: 3), CN 972 (polyester-based aromatic urethane acrylate, number of functional groups: 3), CN 975 (polyester-based aromatic urethane acrylate, number of functional groups: 6), CN 978 (polyester-based aromatic urethane acrylate, number of functional groups: 2), CN 9782 (polyester-based aromatic urethane acrylate, number of functional groups: 2), and CN 9783 (polyester-based aromatic urethane acrylate, number of functional groups: 2) (trade names, all of which are manufactured by Sartomer company); and EBECRYL 210 (number of functional groups: 2) and 220 (number of functional groups: 6) (all of which are manufactured by DAICEL-CYTEC Co., Ltd.). However, the commercially available products of the urethane oligomer are not limited thereto.

The weight average molecular weight of the urethane oligomer is approximately 500 to 20,000 and preferably 500 to 10,000. In this specification, the weight average molecular weight adopts values measured by gel permeation chromatography (GPC).

As the urethane oligomer, one kind may be used alone or two or more kinds may be used in combination.

The content of the urethane oligomer is 5% by mass to 25% by mass, preferably 7% by mass to 20% by mass, and more preferably 8% by mass to 15% by mass with respect to the total mass (100% by mass) of the ink composition. When the content is greater than or equal to 5% by mass, wear resistance is superior. Meanwhile, when the content is less than or equal to 25% by mass, curability is superior.

Polymerizable Compound Other than Above-Described Polymerizable Compounds

As polymerizable compounds other than the above-described polymerizable compounds (hereinafter, referred to as "other polymerizable compounds"), various kinds of monofunctional, bifunctional, and trifunctional or higher polyfunctional monomers and oligomers can be used. Examples of the monomers include unsaturated carboxylic acids such as (meth)acrylic acid, itaconic acid, crotonic acid, isocrotonic acid, and maleic acid and salts or esters thereof; amides and anhydrides thereof; acrylonitriles; styrenes; and various kinds of unsaturated polyesters, unsaturated polyethers, and unsaturated polyamides. In addition, examples of the oligomers include oligomers derived from the monomers such as a linear acryl oligomer; epoxy(meth) acrylate; oxetane(meth)acrylate; and polyester(meth)acrylate.

In addition, the ink composition may contain an N-vinyl compound as other monofunctional monomers or polyfunctional monomers. Examples of the N-vinyl compound include N-vinylformamide, N-vinylcarbazole, N-vinylacetamide, N-vinylpyrrolidone, N-vinylcaprolactam, and acryloylmorpholine; and derivatives thereof.

Among these, at least either a monofunctional or bifunctional (meth)acrylate is preferable from the viewpoint of reducing the viscosity of the ink and improving the curability and the solubility of the photopolymerization initiator. Therefore, the monofunctional or bifunctional (meth)acrylate will be described in detail.

First, Examples of the monofunctional (meth)acrylate include isoamyl(meth)acrylate, stearyl(meth)acrylate, lauryl(meth)acrylate, octyl(meth)acrylate, decyl(meth)acrylate, isomyristyl(meth)acrylate, isostearyl(meth)acrylate, 2-ethylhexyl-diglycol(meth)acrylate, butoxyethyl(meth)acrylate, ethoxy diethylene glycol(meth)acrylate, methoxy diethylene glycol(meth)acrylate, methoxy polyethylene glycol(meth)acrylate, methoxy propylene glycol(meth)acrylate, benzyl(meth)acrylate, phenoxyethyl(meth)acrylate, tetrahydrofurfuryl(meth)acrylate, isobornyl(meth)acrylate, 2-hydroxy-3-phenoxypropyl(meth)acrylate, lactone-modified flexible (meth)acrylate, t-butylcyclohexyl(meth)acrylate, dicyclopentanyl(meth)acrylate, and dicyclopentenyloxyethyl(meth)acrylate. However, the monofunctional (meth)acrylate is not limited thereto.

Examples of the bifunctional (meth)acrylate include 1,6-hexanediol di(meth)acrylate, 1,10-decanediol di(meth)acrylate, neopentyl glycol di(meth)acrylate, 2,4-dimethyl-1,5-pentanediol di(meth)acrylate, butylethylpropanediol(meth) acrylate, ethoxylated cyclohexanemethanol di(meth)acrylate, polyethylene glycol di(meth)acrylate, oligoethylene glycol di(meth)acrylate, ethylene glycol di(meth)acrylate, 2-ethyl-2-butyl-butanediol di(meth)acrylate, neopentyl glycol hydroxypivalate di(meth)acrylate, EC) (ethylene oxide)-modified bisphenol A di(meth)acrylate, bisphenol F polyethoxy di(meth)acrylate, dipolypropylene glycol di(meth)acrylate, polypropylene glycol di(meth)acrylate, 1,4-butanediol di(meth)acrylate, 2-ethyl-2-butylpropanediol di(meth)acrylate, 1,9-nonane di(meth)

acrylate, propoxylated ethoxylated bisphenol A di(meth)acrylate, and tricyclodecane di(meth)acrylate. However, the bifunctional (meth)acrylate is not limited thereto.

In addition, the monofunctional (meth)acrylate may have one or more structures selected from a group consisting of an aromatic ring structure, an aliphatic structure having an hydroxyl group, a saturated alicyclic structure, and an unsaturated alicyclic structure. When other polymerizable compounds include a monofunctional (meth)acrylate having the above-described structure, the viscosity of the ink composition can be reduced. Among these, at least one of a monofunctional (meth)acrylate having an aromatic ring structure and a monofunctional (meth)acrylate which has an aliphatic structure having a hydroxyl group is preferable from the viewpoints of improving the solubility of the photopolymerization initiator and the curability of the ink.

Examples of the monofunctional (meth)acrylate having an aromatic ring structure include benzyl(meth)acrylate, phenoxyethyl(meth)acrylate, and 2-hydroxy-3-phenoxypropyl(meth)acrylate. In addition, examples of the monofunctional (meth)acrylate having a saturated alicyclic structure include isobornyl(meth)acrylate, t-butylcyclohexyl(meth)acrylate, and dicyclopentanyl(meth)acrylate. In addition, examples of the monofunctional (meth)acrylate having an unsaturated alicyclic structure include dicyclopentenyloxyethyl(meth)acrylate. However, the monofunctional (meth)acrylate having an aromatic ring structure is not limited thereto.

Among the above-described monofunctional (meth)acrylates having an aromatic ring structure, a compound represented by the following formula (II) is preferable from the viewpoints of further improving the curability and the solubility in the ink.

$$CH_2=CR^4-COOR^5-C_6H_6 \qquad (II)$$

In the formula (II), $R^4$ represents a hydrogen atom or a methyl group; and $R^5$ represents a divalent organic residue having 1 to 20 carbon atoms.

Preferable examples of the divalent organic residue having 1 to 20 carbon atoms represented by $R^5$ in the formula (II) include a linear, branched, or cyclic alkylene group having 1 to 20 carbon atoms which may be substituted; an alkylene group having 1 to 20 carbon atoms and having an oxygen atom of an ether bond and/or an ester bond in a structure thereof which may be substituted; and a divalent aromatic group having 6 to 11 carbon atoms which may be substituted. Among these, an alkylene group having 1 to 6 carbon atoms such as an ethylene group, an n-propylene group, an isopropylene group, or a butylene group; and an alkylene group having 1 to 9 carbon atoms and an oxygen atom of an ether bond in a structure thereof such as an oxymethylene group, an oxyethylene group, an oxy-n-propylene group, an oxyisopropylene group, or an oxybutylene group are preferably used.

In a case in which each organic residue is a group which may be substituted, the same description as that of the formula (I) shall be applied. Therefore, the description thereof will not be repeated.

Preferable examples of the compound represented by the formula (II) include phenoxyethyl(meth)acrylate and 2-hydroxy-3-phenoxypropyl(meth)acrylate, but the compound represented by the formula (II) is not limited thereto.

In addition, examples of the monofunctional (meth)acrylate which has an aliphatic structure having a hydroxyl group include 2-hydroxybutyl(meth)acrylate, 2-hydroxyethyl(meth)acrylate, 2-hydroxypropyl(meth)acrylate, and 4-hydroxybutyl(meth)acrylate. However, the monofunctional (meth)acrylate having a hydroxyl group and an aliphatic structure is not limited thereto. As the aliphatic structure, a linear or branched alkyl group having 1 to 4 carbon atoms is preferable. When the clear ink composition contains the monofunctional (meth)acrylate which has an aliphatic structure having a hydroxyl group, the weather resistance of the clear ink composition can be further improved. The content of the monofunctional (meth)acrylate which has an aliphatic structure having a hydroxyl group is preferably 5% by mass to 40% by mass and more preferably 10% by mass to 30% by mass with respect to the total mass (100% by mass) of the ink composition.

As other polymerizable compounds, one kind may be used alone or two or more kinds may be used in combination.

The content of polymerizable compounds other than the vinyl ether group-containing (meth)acrylic acid ester and the urethane oligomer is preferably 5% by mass to 70% by mass, more preferably 10% by mass to 65% by mass, and still more preferably 35% by mass to 60% by mass with respect to the total mass (100% by mass) of the ink composition. Among these, the content of the monofunctional (meth)acrylate having an aromatic ring structure is preferably 5% by mass to 40% by mass, more preferably 5% by mass to 30% by mass, and still more preferably 5% by mass to 20% by mass with respect to the total mass (100% by mass) of the ink composition, from the viewpoints of further improving the transparency and the solubility in the ink.

Photopolymerization Initiator

The photopolymerization initiator contained in the ink composition according to the embodiment is used for curing the ink on a surface of a recording medium by photopolymerization with irradiation of ultraviolet rays and forming an image thereon. By using ultraviolet (UV) rays among irradiation light rays, safety can be improved and the cost of a light source lamp can be suppressed. The photopolymerization initiator is not particularly limited as long as it generates active species such as radicals or cations with irradiation of ultraviolet rays and causes to start the polymerization of the polymerizable compounds. For example, a radical photopolymerization initiator and a cationic photopolymerization initiator can be used. Among these, a radical photopolymerization initiator is preferably used.

Examples of the radical photopolymerization initiator include aromatic ketones, acylphosphine oxide compounds, aromatic onium salt compounds, organic peroxides, thio compounds (such as thioxanthone compounds and thiophenyl group-containing compounds), hexaarylbiimidazole compounds, keto oxime ester compounds, borate compounds, adinium compounds, metallocene compounds, active ester compounds, compounds having a carbon-halogen bond, and alkylamine compounds.

Among these, acylphosphine oxide compounds are particularly preferable from the viewpoint of further improving the curability of the ink.

Specific examples of the radical photopolymerization initiator include acetophenone, acetophenonebenzylketal, 1-hydroxycyclohexylphenylketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyldimethylketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)

phenyl]-2-morpholino-propan-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentylphosphine oxide.

Among these, 2,4,6-trimethylbenzoyl-diphenyl-phosphine oxide, bis(2,4,6-trimethylbenzoyl)-phenylphosphine oxide, and 2,4-diethylthioxanthone are preferably used.

Examples of commercially available products of the radical photopolymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl]-2-methyl-propan-1-one), IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrol-1-yl)-phenyl)titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (mixture of oxyphenylacetic acid, 2-[2-oxo-2-phenylacetoxyethoxy]ethylester, oxyphenylacetic acid, and 2-(2-hydroxyethoxy)ethylester) (trade names, all of which are manufactured by BASF Japan Ltd.), KAYACURE DETX-S (2,4-diethylthioxanthone) (trade name, manufactured by Nippon Kayaku Co., Ltd.), LUCIRIN TPO, LR8893, LR8970 (trade names, all of which are manufactured by BASF Japan Ltd.), and UBECRYL P36 (manufactured by UCB Japan Co., Ltd.).

As the photopolymerization initiator, one kind may be used or two or more kinds may be used in combination.

It is preferable that the content of the photopolymerization initiator be 1% by mass to 20% by mass with respect to the total mass (100% by mass) from the viewpoints of improving the curability of the ink and of avoiding the remaining of an undissolved photopolymerization initiator and coloring caused by the photopolymerization initiator.

In particular, when the photopolymerization initiator contains an acylphosphine oxide compound, the content of the acylphosphine oxide compound is preferably 5% by mass to 13% by mass and more preferably 6% by mass to 12% by mass with respect to the total mass (100% by mass) of the ink. When the content is in the above-described range, the photopolymerization initiator is cleaved and achromatized at the same time as irradiation of light and thus light is easily transmitted to the inside. Furthermore, even when a light source such as a light emitting diode (LED) having a narrow emission wavelength range is used, curability and transparency are superior.

Fluorescent Brightening Agent (Sensitizer)

The ink composition according to the embodiment may further contain a fluorescent brightening agent (sensitizer). When the ink composition contains the fluorescent brightening agent, curability is further improved. Examples of the fluorescent brightening agent include naphthalene benzoxazole derivatives, thiophene benzoxazole derivatives, stilbene benzoxazole derivatives, coumarin derivatives, styrene biphenyl derivatives, pyrazolone derivatives, stilbene derivatives, styryl derivatives of benzene and biphenyl, bis(benzazol-2-yl) derivatives, carbostyrils, naphthalimides, derivatives of dibenzothiophene-5,5'-dioxide, pyrene derivatives and pyridotriazoles. However, the fluorescent brightening agent is not limited thereto.

Examples of commercially available products of the fluorescent brightening agent include HOSTALUX KCB, KVC, KS, KS-N, KS-C, KSB, KSB-2, KCU, KM-N, NSM, SNR, NR, and N2R-200 and LEUKOPUR EGM (all of which are manufactured by Clariant GMbH); UVITEX OB, OB-C, and OB-P (all of which are manufactured by BASF Japan Ltd.); KAYALIGHT B, OS, and OSN (all of which are manufactured by Nippon Kayaku Co., Ltd.); HAKKKOL P and OB (all of which are manufactured by Showa Chemical Industry Co., Ltd.); WHITEFLUOR B, PSN, HCS, PHR, and PCS (all of which are manufactured by Sumika Color Co., Ltd.); and NIKKAFLUOR RP, 2R, SB, KB, EFS, and OB and SC 200 and MC (all of which are manufactured by Nippon Chemical Works Co., Ltd.).

As the fluorescent brightening agent, one kind may be used alone or two or more kinds may be used in combination.

The content is preferably 0.10% by mass to 0.75% by mass with respect to the total mass (100% by mass) of the ink composition. When the content is in the above-described range, the solubility in the ink is further improved.

Other Additives

The ink composition according to the embodiment contains other additives (components) other than the above-described additives. These components are not particularly limited, and examples thereof include well-known materials of the related art such as a slip agent (surfactant), a polymerization inhibitor, a polymerization promoter, a penetration enhancer, and a wetting agent (moisturizing agent); and other additives. Examples of other additives include well-known additives of the related art such as a fixing agent, an antifungal agent, a preservative, an antioxidant, an ultraviolet absorber, a chelating agent, and a thickener.

Since the ink composition according to the embodiment is a clear ink, the ink composition does not substantially contain a colorant such as a pigment or a dye. However, the ink composition may contain the colorant within a range not impairing the effects of the invention. For example, the content of the colorant is preferably less than or equal to 0.5% by mass with respect to the total mass (100% by mass) of the ink composition.

As described above, according to the embodiment, it is possible to provide an ultraviolet ray-curable clear ink composition having superior curability, weather resistance, and wear resistance and furthermore having superior transparency and solubility in the ink.

Recording Medium

The ultraviolet ray-curable clear ink composition according to the embodiment is discharged onto a recording medium according to the following recording method to obtain a recorded material. Examples of the recording medium include ink-absorbent or ink non-absorbent recording media. The recording method according to the embodiment can be applied to a wide range of recording media having various absorption performances ranging from ink non-absorbent recording media that is difficult for the ink composition to permeate; to ink-absorbent recording media that is easy for the ink composition to permeate. However, when the ink composition is applied to the ink-absorbent recording medium, the ink composition absorbed onto the recording medium may be difficult to cure. Therefore, it is preferable that the ink composition be applied to the ink non-absorbent recording medium.

The ink-absorbent is not particularly limited, and examples thereof include electrophotographic paper having high permeability of aqueous ink such as plain paper or ink jet paper (having an ink absorbing layer formed of silica particles or alumina particles or having an ink absorbing layer formed of a hydrophilic polymer such as polyvinyl alcohol (PVA) or polyvinyl pyrrolidone (PVP)); and general offset paper having relatively low permeability of aqueous ink such as art paper, coated paper, or cast paper.

The ink non-absorbent recording medium is not particularly limited, and examples thereof include films or plates formed of plastics such as polyvinyl chloride, polyethylene, polypropylene, and polyethylene terephthalate (PET); plates formed of metals such as iron, silver, copper, and aluminum; metal plates and plastic films prepared by vapor deposition of the above-described metals; and plates formed of stainless steel or brass alloys.

Recording Method

An embodiment of the invention relates to a recording method. The recording method includes a discharging step of discharging the ultraviolet ray-curable clear ink composition according to the embodiment onto a recording medium to be attached thereonto; and a curing step of irradiating the ink composition, discharged in the discharging step, with ultraviolet rays to cure the ink composition. In this way, the ink composition is cured on the recording medium, and a coating film (cured film) of the ink is formed thereon.

Discharging Step

In the discharging step, a well-known ink jet recording apparatus can be used as described above. When the ink composition according to the embodiment is discharged, in order to improve discharge stability, the viscosity at 20° C. of the ink composition is preferably less than or equal to 35 mPa·s and more preferably less than or equal to 25 mPa·s.

The ultraviolet ray-curable clear ink composition according to the embodiment has a higher viscosity that that of an aqueous ink composition which is normally used as ink jet ink. Therefore, the viscosity largely varies depending on the variation in temperature when being discharged. Such viscosity variation of the ink largely affects on changes in the size and discharge rate of ink droplets, which may lead to deterioration in image quality. Therefore, it is preferable that the temperature of the ink when being discharged be maintained as constantly as possible.

Curing Step

Next, in the curing step, the ink composition, discharged onto the recording medium, is irradiated with ultraviolet rays (light) emitted from a light source to cure the ink composition. In this step, the photopolymerization initiator included in the ink composition is decomposed into initiating species such as radicals, acids, and bases by irradiation of ultraviolet rays; and the polymerization of photopolymerizable compounds is promoted by the function of the initiating species. Alternatively, in this step, the polymerization of photopolymerizable compounds starts due to irradiation of ultraviolet rays. At this time, when the ink composition contains both a polymerization initiator and a sensitizing dye, the sensitizing dye in the system absorbs ultraviolet rays and is excited. When this excited sensitizing dye comes into contact with the photopolymerization initiator, the decomposition of the photopolymerization initiator is promoted, thereby achieving a higher-sensitivity curing reaction.

As the light source (ultraviolet ray source), a mercury lamp or a gas or solid-state laser is normally used. As a light source used for curing the ultraviolet ray-curable clear ink composition, a mercury lamp and a metal halide lamp are widely known. These lamps have a wide emission wavelength range and thus can simultaneously cure both the surface and the inside of the ink coating film.

Meanwhile, currently, a mercury-free lamp is strongly desired from the viewpoint of environmental protection, and it is environmentally helpful that a GaN-based ultraviolet light-emitting device is used instead. Furthermore, a light emitting diode (LED) such as an ultraviolet light emitting diode (UV-LED) and an ultraviolet laser diode (UV-LD) has characteristics of small size, long lifetime, high efficiency, and low cost; and thus is expected as a light source for ultraviolet ray-curable clear ink and is particularly effective as a curing light source for an ink jet recording apparatus. On the other hand, when an LED is used, the transparency of the ink coating film has a tendency to deteriorate as compared to a case of using a mercury lamp or a metal halide lamp. Therefore, when the ink composition according to the embodiment is used together, the effects of the LED is significantly large.

The thickness of the cured film obtained in the curing step, that is the thickness of the cured ultraviolet ray-curable clear ink is preferably 8 µm to 40 µm and more preferably 10 µm to 40 µm from the viewpoints of further improving curability and preventing the clear ink from being colored.

In particular, in the case of thick-film printing, since the amount of ink discharged is increased, the amount of curing energy is easily increased. In addition, when the clear ink is thick, there is a small possibility of being colored. Accordingly, when the upper limit of the thickness of the cured film is the above-described value, the transparency and weather resistance of a recorded material can be further improved. When the curd film is thick, the thickness is preferably 15 µm to 40 µm, more preferably 20 µm to 40 µm, and still more preferably 25 µm to 35 µm, from the viewpoints of imparting design properties to a surface of a recorded material due to an embossing effect; and of obscuring convex and concave portions on a surface of a recorded material which are generated due to a coating film of a color ink.

The thickness of the ink coating film obtained in the discharging step is not particularly limited because the thickness of the cured film only has to be in the above-described preferable range. That is, "the thickness" described herein represents the thickness of the cured film unless specified otherwise.

In addition, in order to further improve the wear resistance and glossiness of a recorded material, the clear ink according to the embodiment can be used for overprinting, as well as for normal printing in which the discharging step is performed once (an image is formed on a given range once). In the overprinting, the discharging step; and the irradiation of ultraviolet rays on the clear ink, attached onto the recording medium in the discharging step are performed multiple times. In this case, "overprinting" can be used interchangeably with "overlap printing", "thick coating" or "multiple times of attachment of the ink".

"The irradiation of ultraviolet rays on the clear ink, attached onto the recording medium in the discharging step" may be performed by the irradiation of ultraviolet rays in the curing step; or may be performed by different irradiation from the irradiation of ultraviolet rays in the curing step. Among these, in the case of the latter irradiation, irradiation conditions such as irradiation energy may be the same as or different from those in the irradiation of ultraviolet rays in the curing step.

In the case of the normal printing, the thickness only has to be approximately 10 µm; whereas in the case of the overprinting, the total thickness is preferably 15 µm to 40 µm, more preferably 20 µm to 40 µm, and still more preferably 25 µm to 35 µm. When the thickness in the case of the overprinting is in the above-described range, the clear ink can be effectively prevented from being colored. In the overprinting, the thickness of the ink, attached onto a recording medium by performing the discharging step once, is preferably 5 µm to 15 µm in terms of the thickness of the cured film. In the case of the overprinting, it is preferable that, whenever the discharging step is performed once, the irradiation of ultraviolet rays be performed, that is, the attached ink be irradiated with ultraviolet rays. Examples of an irradiation light source include the light sources used in the curing step. The irradiation energy irradiated whenever the discharging step is performed once only has to cure at least a part of the ink. When the discharge step is performed multiple times, the irradiation of ultraviolet rays in the final irradiation step may be the same as the irradiation of ultraviolet rays in the curing step; or ultraviolet rays having an amount of irradiation energy that can cure at least a part of the ink may be irradiated first, and then the irradiation of ultraviolet rays in the curing step may be performed.

Ink Jet Recording Apparatus

Examples of an ink jet recording apparatus used in the above-described recording method include a line printer and a serial printer, and either one can be used. An example of the ink jet recording apparatus used in the recording method will be described. FIG. 1 is a diagram schematically illustrating an example of configuration in the vicinity of a head of an ink jet recording apparatus which is a line printer. The ink jet recording apparatus (hereinafter, simply referred to as "recording apparatus") include a black ink head K, a cyan ink head C, a magenta ink M, an yellow ink head Y, a first clear ink head CL1, and a second clear ink head CL2. When an upper stream side transport roller 23A and a downstream side transport roller 23B rotates, a belt 24 transports a recording medium S in the transport direction; inks are discharged onto the recording medium S at positions opposite the respective heads (discharging step). On the downstream side of the respective heads in the transport direction, preliminary curing irradiation portions 42a to 42e and a main curing irradiation portion 44 are arranged to irradiate the transported recording medium S with ultraviolet rays (curing step). The second clear ink head CL2 includes an upstream side head CL2a and an downstream side head CL2b. When the clear ink (clear ink composition) is discharged from plural clear ink heads as described above, thick-film printing can be performed. Such a recording apparatus can be constituted as illustrated in, for example, FIG. 14 of JP-A-2010-179536.

The ultraviolet ray-curable clear ink composition according to the embodiment can be used in both the case of using an LED as the light source and the case of using a metal halide lamp as the light source. Based on the above description, an UV-LED is preferable as the light source.

When ultraviolet rays are irradiated, the emission peak length is preferably in a range of 360 nm to 420 nm and more preferably in a range of 365 nm to 410 nm; and the irradiation energy is preferably less than 300 mJ/cm$^2$ and more preferably less than 200 mJ/cm$^2$. In this case, low-energy and high-speed curing can be performed due to the composition of the ink composition according to the embodiment. The irradiation energy can be obtained by multiplying the irradiation intensity by the irradiation time. Due to the composition of the ink composition according to the embodiment, the irradiation time can be reduced. In this case, the printing speed is increased. Meanwhile, due to the composition of the ink composition according to the embodiment, the irradiation intensity can be reduced. In this case, the size and cost of the apparatus can be reduced. At this time, it is preferable that an UV-LED be used for the irradiation of ultraviolet rays. Such an ink composition can be obtained by containing a polymerizable compound which causes to start polymerization due to irradiation of ultraviolet rays having the above-described wavelength range; and a photopolymerization initiator which is decomposed by irradiation of ultraviolet rays having the above-described wavelength range.

As described above, according to the embodiment, it is possible to provide a recording method using an ultraviolet ray-curable clear ink composition having superior curability, weather resistance, and wear resistance and furthermore having superior transparency and solubility in the ink.

EXAMPLES

Hereinafter, the embodiments will be described in detail using Examples and Comparative Examples. However, the embodiments are not limited to Examples and Comparative Examples.

Used Material

Materials (components) used in Examples and Comparative Examples are as follows.

Vinyl Ether Group-Containing (Meth)acrylic Acid Ester 2-(2-vinyloxyethoxy)ethyl acrylate (VEEA (trade name), manufactured by Nippon Shokubai Co., Ltd.; hereinafter, abbreviated as VEEA)

In the following tables, the vinyl ether group-containing (meth)acrylic acid ester is abbreviated as "Acryl and Vinyl-Containing Monomer".

Urethane Oligomers

CN 9893 (trade name, polyether-based aliphatic urethane acrylate, number of functional groups: 2, manufactured by Sartomer company)

EBECRYL 8405 (trade name, aliphatic urethane acrylate oligomer, number of functional groups: 4, manufactured by DAICEL-CYTEC Co., Ltd.; hereinafter, abbreviated as "EB 8405")

EBECRYL 5129 (trade name, aliphatic urethane acrylate oligomer, number of functional groups: 6, manufactured by DAICEL-CYTEC Co., Ltd.; hereinafter, abbreviated as "EB 5129")

EBECRYL 270 (trade name, aliphatic urethane acrylate oligomer, number of functional groups: 2, manufactured by DAICEL-CYTEC Co., Ltd.; hereinafter, abbreviated as "EB 270")

CN 975 (trade name, polyester-based aromatic urethane acrylate, number of functional groups: 6, manufactured by Sartomer company)

Oligomers Other than Urethane Oligomers

CN 104 (bisphenol A-based epoxy acrylate oligomer, number of functional groups: 2, manufactured by Sartomer company)

EBECRYL 767 (trade name, linear acrylic oligomer, manufactured by DAICEL-CYTEC Co., Ltd.; hereinafter, abbreviated as "EB 767") Monofunctional (Meth)acrylate Having Aromatic Ring Structure Phenoxy acrylate (VISCOAT #192 (trade name), manufactured by Osaka Organic Chemical Industry Ltd.; hereinafter, abbreviated as "PEA")

2-hydroxy-3-phenoxypropyl acrylate (DA 141 (trade name), manufactured by Nagase Chemtex Corporation; hereinafter, abbreviated as "HPPA")

In the following tables, the monofunctional (meth)acrylate having an aromatic ring structure is abbreviated as "Aromatic Ring Monofunctional AC". Polymerizable Compounds Other than Above-Described Polymerizable Compounds SR 508 (trade name, dipropylene glycol diacrylate, manufactured by Sartomer company; hereinafter, abbreviated as "DPGDA")

4HBA (trade name, 4-hydroxybutyl acrylate, manufactured by Nippon Kasei Chemical Co., Ltd.)

Photopolymerization Initiator

IRGACURE 819 (trade name, manufactured by BASF Japan Co., Ltd., solid content: 100%; hereinafter, abbreviated as "819")

DAROCURE TPO (trade name, manufactured by BASF Japan Co., Ltd., solid content: 100%; hereinafter, abbreviated as "TPO")

Fluorescent Brightening Agent (Sensitizer)

HOSTALUX KCB (trade name, 1,4-bis(benzoxazol-2-yl) naphthalene, manufactured by Clariant Gmbh; hereinafter, abbreviated as "KCB") Examples 1 to 13 and Comparative Examples 1 to 7

Materials shown in Tables 1 to 3 below were added so as to obtain the respective compositions (unit: % by mass) shown in Tables 1 to 3, followed by stirring with a high-speed water-cooling type stirrer. As a result, ultraviolet ray-curable clear ink compositions were obtained.

TABLE 1

| Material | Kind | Number of Functional Groups | Ex. 1 | Ex. 2 | Ex. 3 | Ex. 4 | Ex. 5 | Ex. 6 | Ex. 7 |
|---|---|---|---|---|---|---|---|---|---|
| VEEA | Acryl and Vinyl-Containing Monomer | — | 32.00 | 32.00 | 32.00 | 32.00 | 32.00 | 32.00 | 32.00 |
| PEA | Aromatic Monofunctional AC | — | — | 15.00 | — | 15.00 | 15.00 | 15.00 | 15.00 |
| HPPA | Aromatic Monofunctional AC | — | — | — | 15.00 | — | — | — | — |
| DPGDA | — | — | 28.75 | 13.75 | 13.75 | 13.75 | 13.75 | 13.75 | 13.75 |
| 4HBA | — | — | 20.00 | 20.00 | 20.00 | 20.00 | 20.00 | 20.00 | 20.00 |
| CN 9893 | Aliphatic Urethane Oligomer | 2 | 10.00 | 10.00 | 10.00 | — | — | — | — |
| EB 8405 | Aliphatic Urethane Oligomer | 4 | — | — | — | 10.00 | — | — | — |
| EB 5129 | Aliphatic Urethane Oligomer | 6 | — | — | — | — | 10.00 | — | — |
| EB 270 | Aromatic Urethane Oligomer | 2 | — | — | — | — | — | 10.00 | — |
| CN 975 | Aromatic Urethane Oligomer | 6 | — | — | — | — | — | — | 10.00 |
| CN 104 | Epoxy Oligomer | 2 | — | — | — | — | — | — | — |
| EB 767 | Acrylic Oligomer | — | — | — | — | — | — | — | — |
| 819 | Photopolymerization Initiator | — | 5.00 | 5.00 | 5.00 | 5.00 | 5.00 | 5.00 | 5.00 |
| TPO | Photopolymerization Initiator | — | 4.00 | 4.00 | 4.00 | 4.00 | 4.00 | 4.00 | 4.00 |
| KCB | Fluorescent Brightening Agent | — | 0.25 | 0.25 | 0.25 | 0.25 | 0.25 | 0.25 | 0.25 |
| | Total | | 100.00 | 100.00 | 100.00 | 100.00 | 100.00 | 100.00 | 100.00 |

TABLE 2

| Material | Kind | Number of Functional Groups | Ex. 8 | Ex. 9 | Ex. 10 | Ex. 11 | Ex. 12 | Ex. 13 |
|---|---|---|---|---|---|---|---|---|
| VEEA | Acryl and Vinyl-Containing Monomer | — | 32.00 | 32.00 | 32.00 | 32.00 | 15.00 | 45.00 |
| PEA | Aromatic Monofunctional AC | — | 15.00 | 15.00 | 15.00 | 15.00 | 15.00 | 15.00 |
| HPPA | Aromatic Monofunctional AC | — | — | — | — | — | — | — |
| DPGDA | — | — | 17.75 | 9.75 | 18.75 | — | 30.75 | 0.75 |
| 4HBA | — | — | 20.00 | 20.00 | 20.00 | 18.75 | 20.00 | 20.00 |
| CN 9893 | Aliphatic Urethane Oligomer | 2 | 10.00 | 10.00 | 5.00 | 25.00 | 10.00 | 10.00 |
| EB 8405 | Aliphatic Urethane Oligomer | 4 | — | — | — | — | — | — |
| EB 5129 | Aliphatic Urethane Oligomer | 6 | — | — | — | — | — | — |
| EB 270 | Aromatic Urethane Oligomer | 2 | — | — | — | — | — | — |
| CN 975 | Aromatic Urethane Oligomer | 6 | — | — | — | — | — | — |
| CN 104 | Epoxy Oligomer | 2 | — | — | — | — | — | — |
| EB 767 | Acrylic Oligomer | — | — | — | — | — | — | — |
| 819 | Photopolymerization Initiator | — | 2.00 | 6.00 | 5.00 | 5.00 | 5.00 | 5.00 |
| TPO | Photopolymerization Initiator | — | 3.00 | 7.00 | 4.00 | 4.00 | 4.00 | 4.00 |
| KCB | Fluorescent Brightening Agent | — | 0.25 | 0.25 | 0.25 | 0.25 | 0.25 | 0.25 |
| | Total | | 100.00 | 100.00 | 100.00 | 100.00 | 100.00 | 100.00 |

TABLE 3

| Material | Kind | Number of Functional Groups | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| VEEA | Acryl and Vinyl-Containing Monomer | — | — | 15.00 | — | 32.00 | 32.00 | 32.00 | 32.00 |
| PEA | Aromatic Monofunctional AC | — | 15.00 | 15.00 | 15.00 | 15.00 | 15.00 | 15.00 | 15.00 |
| HPPA | Aromatic Monofunctional AC | — | — | — | — | — | — | — | — |
| DPGDA | — | — | 45.75 | 40.75 | 55.75 | 13.75 | 13.75 | 20.75 | — |
| 4HBA | — | — | 20.00 | 20.00 | 20.00 | 20.00 | 20.00 | 20.00 | 13.75 |

TABLE 3-continued

| Material | Kind | Number of Functional Groups | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|---|
| CN 9893 | Aliphatic Urethane Oligomer | 2 | 10.00 | — | — | — | — | 3.00 | 30.00 |
| EB 8405 | Aliphatic Urethane Oligomer | 4 | — | — | — | — | — | — | — |
| EB 5129 | Aliphatic Urethane Oligomer | 6 | — | — | — | — | — | — | — |
| EB 270 | Aromatic Urethane Oligomer | 2 | — | — | — | — | — | — | — |
| CN 975 | Aromatic Urethane Oligomer | 6 | — | — | — | — | — | — | — |
| CN 104 | Epoxy Oligomer | 2 | — | — | — | 10.00 | — | — | — |
| EB 767 | Acrylic Oligomer | — | — | — | — | — | 10.00 | — | — |
| 819 | Photopolymerization Initiator | — | 5.00 | 5.00 | 5.00 | 5.00 | 5.00 | 5.00 | 5.00 |
| TPO | Photopolymerization Initiator | — | 4.00 | 4.00 | 4.00 | 4.00 | 4.00 | 4.00 | 4.00 |
| KCB | Fluorescent Brightening Agent | — | 0.25 | 0.25 | 0.25 | 0.25 | 0.25 | 0.25 | 0.25 |
| | Total | | 100.00 | 100.00 | 100.00 | 100.00 | 100.00 | 100.00 | 100.00 |

Evaluation Items

1. Curability

Each of the above-described ultraviolet ray-curable clear ink compositions was coated on LUMIRROR #125-E20 (trade name, manufactured by Toray industries Inc., PET film) using a bar coater (manufactured by Tester Sangyo Co., Ltd.). The thickness of a coating film was 10 μm. Next, the coated ink was irradiated with ultraviolet rays having an illuminance of 70 mW/cm² emitted from an LED (FIREFLY (trade name), manufactured by Phoseon Technology) having a peak at a wavelength of 395 nm for a predetermined time. As a result, a cured ink coating film was obtained. After the irradiation, a surface of the ink coating film was rubbed with a cotton swab under a load of 100 g. The irradiation energy required until the surface was not scratched was measured.

The evaluation criteria are as follows.
The evaluation results are shown in Tables 4 to 6.
A: Less than 200 mJ/cm²
B: 200 mJ/cm² or higher and less than 300 mJ/cm²
C: 300 mJ/cm² or higher and less than 400 mJ/cm²
D: 400 mJ/cm² or higher 2. Weather Resistance Each of the above-described ultraviolet ray-curable clear ink compositions was coated on 5829R (trade name, manufactured by MACtac, vinyl chloride sheet) under conditions of Duty 100% and a resolution of 720 dpi×720 dpi. Next, ultraviolet rays were irradiated under the same conditions as in the test of the above item "1. Curability". As a result, a cured ink coating film was obtained.

In Examples and Comparative Examples, cured ink coating films having a thickness of 10 μm and cured ink coating films having a thickness of 30 μm were obtained. Each of the cured ink coating films having a thickness of 30 μm was obtained by forming two coating films having a thickness of 10 μm on the above-described coating film having a thickness of 10 μm under the same conditions so as to have a final thickness of 30 μm.

Using a super xenon weather meter SX75 (trade name, manufactured by Suga Test Instruments Co., Ltd., 180 mW/m², BPT: 63° C., humidity: 50%), each of the cured ink coating films was exposed at an energy of 300 MJ/m².

Using a colorimeter SPECTROLINO (trade name, manufactured by Gretag-Macbeth AG), the b* values of the ink coating film before the exposure (hereinafter, also referred to as "initial coating film") and the ink coating film after the exposure were measured. Then, Δb* was calculated using the following expression (I) to evaluate degrees of yellowness.

$$\Delta b^* = b^* \text{ of Coating Film after Exposure} - b^* \text{ of Initial Coating Film} \quad (I)$$

The evaluation criteria are as follows. The evaluation results are shown in Tables 4 to 6 below.
A: Δb*<1.0
B: 1.0≤Δb*<3.0
C: 3.0≤Δb*<5.0
D: 5.0≤b*

3. Transparency

Each of the above-described ultraviolet ray-curable clear ink compositions was coated on 5829R (trade name, manufactured by MACtac, vinyl chloride sheet) under conditions of Duty 100% and a resolution of 720 dpi×720 dpi. Next, ultraviolet rays were irradiated under the same conditions as in the test of the above item "1. Curability". As a result, a cured ink coating film was obtained. After the irradiation of ultraviolet rays, cured ink coating films having a thickness of 10 μm and cured ink coating films having a thickness of 30 μm were obtained. The ink coating films having a thickness of 30 μm were obtained with the same method as that of the test of the above-described item "2. Weather Resistance".

Using a colorimeter SPECTROLINO (trade name, manufactured by Gretag-Macbeth AG), the b* value of each of the obtained ink coating films was measured.

The evaluation criteria are as follows.
The evaluation results thereof are shown in Tables 4 to 6.
A: b*<1.0
B: 1.0≤b*<2.0
C: 2.0≤b*

4. Wear Resistance

Using a Gakushin-type rubbing fastness tester AB-301 (manufactured by Tester Sangyo Co., Ltd.), the evaluation for wear resistance was performed. As a evaluation method, a surface of each ink coating film (thickness: 10 μm) obtained in the test of the above-described item "1. Curability" was rubbed back and forth 100 times with unbleached muslin, which was a friction block, under a load of 100 g. After being rubbed, the scratch degrees on the surface of the ink coating film was visually inspected.

The evaluation criteria are as follows.
The evaluation criteria are shown in Tables 4 to 6.
A: No scratches were observed
B: Scratches were observed on a less than ⅓ surface area of the coating film
C: Scratches were observed on a ⅓ and more and less than ⅔ surface area of the coating film
D: Scratches were observed on a ⅔ or more surface area of the coating film 5. Solubility All the materials used for preparing each of the ultraviolet ray-curable clear ink compositions were put into a beaker, followed by stirring with a magnetic stirrer (stirring rate: 100 rpm). Then, powder materials such as a photopolymerization initiator and a fluorescent brightening agent were evaluated for solubility by visual inspection.

The evaluation criteria are as follows.
The evaluation results thereof are shown in Tables 4 to 6.
A: The powder materials were dissolved within 12 hours
B: The powder materials were not dissolved after 12 hours

TABLE 4

| Evaluation Item | Thickness of Film | Ex. 1 | Ex. 2 | Ex. 3 | Ex. 4 | Ex. 5 | Ex. 6 | Ex. 7 |
|---|---|---|---|---|---|---|---|---|
| Curability | 10 μm | B | A | A | A | A | A | A |
| Weather Resistance | 10 μm | A | A | A | B | C | B | C |
|  | 30 μm | A | B | B | C | C | C | C |
| Transparency | 10 μm | A | A | A | A | A | A | A |
|  | 30 μm | B | B | B | B | B | B | B |
| Wear Resistance | 10 μm | A | A | A | A | A | A | A |
| Solubility | — | B | A | A | A | A | A | A |

TABLE 5

| Evaluation Item | Thickness of Film | Ex. 8 | Ex. 9 | Ex. 10 | Ex. 11 | Ex. 12 | Ex. 13 |
|---|---|---|---|---|---|---|---|
| Curability | 10 μm | B | A | A | B | B | A |
| Weather Resistance | 10 μm | A | A | A | A | A | A |
|  | 30 μm | B | C | C | B | C | B |
| Transparency | 10 μm | A | B | A | A | B | A |
|  | 30 μm | B | C | B | B | B | B |
| Wear Resistance | 10 μm | A | A | B | A | B | A |
| Solubility | — | A | B | A | B | A | A |

TABLE 6

| Evaluation Item | Thickness of Film | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|---|
| Curability | 10 μm | D | A | C | A | C | B | D |
| Weather Resistance | 10 μm | A | A | A | D | B | A | A |
|  | 30 μm | B | D | D | D | B | D | B |
| Transparency | 10 μm | A | A | A | A | B | B | A |
|  | 30 μm | C | B | C | B | C | B | C |
| Wear Resistance | 10 μm | A | D | D | A | A | C | A |
| Solubility | — | A | A | A | A | A | A | B |

In Tables 4 to 6 above, the symbol "-" represents the evaluation test being not performed.

It was found from the above results of Tables 4 to 6 that the curability of the ink, the weather resistance and transparency of a recorded material having any one of a thin film and a thick film were superior; and the wear resistance of the recorded material and the solubility in the ink were also superior when a specific ultra-violet ray-curable clear ink composition (Examples) is compared to the other ink compositions (Comparative Examples), the specific ultra-violet ray-curable clear ink composition including: a polymerizable compound that contains a vinyl ether group-containing (meth)acrylic acid ester represented by the formula (I) and 5% by mass to 25% by mass of urethane oligomer with respect to the total mass (100% by mass) of the ink composition; and a photopolymerization initiator.

Hereinafter, the results of Tables 4 to 6 will be discussed in detail. First, the oligomers will be discussed among the polymerizable compounds. In the case of using the epoxy oligomer, the weather resistance was low; and in the case of using the acrylic oligomer, the curability was low. On the other hand, in the case of using the urethane oligomer, both the weather resistance and the curability were superior. In particular, the urethane oligomers in which the number of functional groups in the (meth)acryloyl group is 4 or lower showed superior weather resistance. Accordingly, it was found that the aromatic urethane oligomers were superior to the aliphatic urethane oligomers. In addition, it was found that the ink composition according to the embodiment was particularly effective for use in overprinting, which is an important use of clear ink, from the viewpoints of obtaining superior weather resistance and transparency.

Regarding The transparency of the thick films, in comparative Examples having particularly low curability, the curing was insufficient and the unreacted photopolymerization initiator remained. It is assumed that these factors cause an increase in b*. In addition, regarding the difference in weather resistance between the thick films and the thin films, it was found that the thin films had superior weather resistance to that of the thick films. The reason is not clear, but is assumed to be as follows: the thick films have a tendency that oxygen, generated in a cured film, is not discharged outside the cured film along with deterioration of the cured film, which promotes the deterioration of the cured film. In addition, a cured film derived from the urethane oligomer has a crosslinked urethane structure. It is assumed that this structure causes oxygen to be easily discharged outside the cured film while securing superior wear resistance. However, the scope of the embodiments is not limited to these assumptions.

Furthermore, an ink composition is prepared with the same preparation method as that of Comparative Example 2, except that 20.75% by mass of DPGDA was used, 2.0% by mass of NOVOPERM YELLOW 4G01 (trade name, manufactured by Clariant Gmbh, C.I. Pigment Yellow 155), and 1.0% by mass of SOLSPERSE 32000 (manufactured by Lubrizol Corporation) were used. Then, the ink composition was evaluated with the same method as above. As a result, it was found that the weather resistance of the coating film having a thickness of 30 μm was evaluated as "A"; however, the coating film could not be used as a clear ink because the color thereof is yellow. In addition, an ink coating film having a thickness of 30 μm was obtained with the same method as that of Examples and Comparative examples, except that the discharging (attachment) and curing were respectively performed once instead of forming two curing films having a thickness of 10 μm on the curing film having a thickness of 10 μm (performing the discharging and curing three times). The transparency of the ink coating film was evaluated with the same method as above. As a result, it was found that the entire transparency deteriorated; and the irradiation energy thereof required for curing was three times the irradiation energy of the coating film having a thickness of 10 μam required for curing.

The entire disclosure of Japanese Patent Application No. 2012-074083, filed Mar. 28, 2012 is expressly incorporated by reference herein.

What is claimed is:

1. An ultraviolet ray-curable clear ink composition comprising:
    a polymerizable compound; and
    a photopolymerization initiator,
        wherein the polymerizable compound contains a vinyl ether group-containing (meth)acrylic acid ester represented by the following formula (I), and 5% by mass to 25% by mass of urethane oligomer with respect to the total mass of the ink composition

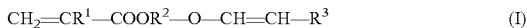
$$CH_2=CR^1-COOR^2-O-CH=CH-R^3 \qquad (I)$$

(in the formula (I), $R^1$ represents a hydrogen atom or a methyl group; $R^2$ represents a divalent organic residue having 2 to 20 carbon atoms; and $R^3$ represents a hydrogen atom or a monovalent organic residue having 1 to 11 carbon atoms),
        wherein the polymerizable compound further contains at least one monofunctional (meth)acrylate having an aromatic ring structure present in 5 to 40% by mass with respect to the total mass of the ink composition.

2. The ultraviolet ray-curable clear ink composition according to claim 1,
    wherein the urethane oligomer contains a bifunctional to tetrafunctional (meth)acryloyl group.

3. The ultraviolet ray-curable clear ink composition acquiring to claim 1,
    wherein the urethane oligomer is an aliphatic urethane oligomer.

4. The ultraviolet ray-curable clear ink composition according to claim 1,
    wherein the polymerization initiator contains 5% by mass to 13% by mass of acylphosphine oxide compound with respect to the total mass of the ink composition.

5. The ultraviolet ray-curable clear ink composition according to claim 1,
    wherein the polymerizable compound further contains at least a monofunctional (meth)acrylate which has an aliphatic structure having a hydroxyl group, wherein the content of a monofunctional (meth)acrylate which has an aliphatic structure having a hydroxyl group is 5 to 40% by mass, relative to the total mass of the ink composition.

6. The ultraviolet ray-curable clear ink composition according to claim 1,
    wherein a content of the vinyl ether group-containing (meth)acrylic acid ester represented by the formula (I) is 20% by mass to 70% by mass with respect to the total mass of the ink composition.

7. A recording method comprising:
    discharging the ultraviolet ray-curable clear ink composition according to claim 1 onto a recording medium to be attached thereonto; and
    curing the attached ultraviolet ray-curable clear ink composition,
    wherein the thickness of the cured ultraviolet ray-curable clear ink composition is 8 μm to 40 μm.

8. A recording method comprising:
    discharging the ultraviolet ray-curable clear ink composition according to claim 2 onto a recording medium to be attached thereonto; and
    curing the attached ultraviolet ray-curable clear ink composition,
    wherein the thickness of the cured ultraviolet ray-curable clear ink composition is 8 μm to 40 μm.

9. A recording method comprising:
    discharging the ultraviolet ray-curable clear ink composition according to claim 3 onto a recording medium to be attached thereonto; and
    curing the attached ultraviolet ray-curable clear ink composition,
    wherein the thickness of the cured ultraviolet ray-curable clear ink composition is 8 μm to 40 μm.

10. A recording method comprising:
    discharging the ultraviolet ray-curable clear ink composition according to claim 4 onto a recording medium to be attached thereonto; and
    curing the attached ultraviolet ray-curable clear ink composition,
    wherein the thickness of the cured ultraviolet ray-curable clear ink composition is 8 μm to 40 μm.

11. A recording method comprising:
    discharging the ultraviolet ray-curable clear ink composition according to claim 5 onto a recording medium to be attached thereonto; and
    curing the attached ultraviolet ray-curable clear ink composition,
    wherein the thickness of the cured ultraviolet ray-curable clear ink composition is 8 μm to 40 μm.

12. A recording method comprising:
    discharging the ultraviolet ray-curable clear ink composition according to claim 6 onto a recording medium to be attached thereonto; and
    curing the attached ultraviolet ray-curable clear ink composition,
    wherein the thickness of the cured ultraviolet ray-curable clear ink composition is 8 μm to 40 μm.

13. A recording method comprising:
    discharging the ultraviolet ray-curable clear ink composition according to claim 1 onto a recording medium to be attached thereonto; and
    curing the attached ultraviolet ray-curable clear ink composition,
    wherein the thickness of the cured ultraviolet ray-curable clear ink composition is 15 μm to 40 μm.

14. A recording method comprising:
    discharging the ultraviolet ray-curable clear ink composition according to claim 2 onto a recording medium to be attached thereonto; and
    curing the attached ultraviolet ray-curable clear ink composition,
    wherein the thickness of the cured ultraviolet ray-curable clear ink composition is 15 μm to 40 μm.

15. A recording method comprising:
    discharging the ultraviolet ray-curable clear ink composition according to claim 3 onto a recording medium to be attached thereonto; and
    curing the attached ultraviolet ray-curable clear ink composition,
    wherein the thickness of the cured ultraviolet ray-curable clear ink composition is 15 μm to 40 μm.

16. A recording method comprising:
    discharging the ultraviolet ray-curable clear ink composition according to claim 4 onto a recording medium to be attached thereonto; and
    curing the attached ultraviolet ray-curable clear ink composition,
    wherein the thickness of the cured ultraviolet ray-curable clear ink composition is 15 μm to 40 μm.

17. A recording method comprising:
    discharging the ultraviolet ray-curable clear ink composition according to claim 5 onto a recording medium to be attached thereonto; and curing the attached ultraviolet ray-curable clear ink composition,
wherein the thickness of the cured ultraviolet ray-curable clear ink composition is 15 μm to 40 μm.

18. A recording method comprising:
discharging the ultraviolet ray-curable clear ink composition according to claim 6 onto a recording medium to be attached thereonto; and
curing the attached ultraviolet ray-curable clear ink composition,
wherein the thickness of the cured ultraviolet ray-curable clear ink composition is 15 μm to 40 μm.

19. The recording method according to claim 7,
wherein in the curing, the ultraviolet ray-curable clear ink composition is irradiated with ultraviolet rays emitted from a light emitting diode having a peak wavelength of 360 nm to 420 nm to cure the ultraviolet ray-curable clear ink composition.

20. The recording method according to claim 13,
wherein the discharging and the irradiation of ultraviolet rays on the ultraviolet ray-curable clear ink composition, attached onto the recording medium in the discharging, are performed multiple times.

\* \* \* \* \*